(12) United States Patent
Knight et al.

(10) Patent No.: US 6,377,589 B1
(45) Date of Patent: Apr. 23, 2002

(54) COMMUNICATIONS SYSTEM

(75) Inventors: Richard R Knight, Stowmarket; David W Parkinson, Ipswich; Robert E Tuck, Daventry, all of (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/043,421

(22) PCT Filed: Nov. 19, 1997

(86) PCT No.: PCT/GB97/03180

§ 371 Date: Mar. 19, 1999

§ 102(e) Date: Mar. 19, 1999

(87) PCT Pub. No.: WO98/24078

PCT Pub. Date: Jun. 4, 1998

(30) Foreign Application Priority Data

Nov. 26, 1996 (EP) .............................................. 96308546

(51) Int. Cl.[7] .............................................. G08B 25/01
(52) U.S. Cl. ........................ 370/524; 370/522; 340/506
(58) Field of Search ................................ 370/524, 522; 340/502, 505, 534, 539, 506, 3.51, 10.1; 379/106.01, 106.11; 348/152; 705/65

(56) References Cited

U.S. PATENT DOCUMENTS

| 3,713,142 A | * | 1/1973 | Getchell | 340/505 |
| 4,466,001 A | * | 8/1984 | Moore | 340/825.08 |
| RE32,468 E | * | 8/1987 | Le Nay | 340/506 |
| 5,581,297 A | * | 12/1996 | Koz | 348/152 |
| 5,717,379 A | * | 2/1998 | Peters | 340/539 |
| 5,926,546 A | * | 7/1999 | Maeda | 705/65 |

OTHER PUBLICATIONS

Patent Abstracts of Japan vol. 15, No. 147 (E–1055), Apr. 12, 1991, JP 03 022697 by Hideo, Jan. 31, 1991.*

* cited by examiner

Primary Examiner—Edwin C. Holloway, III
(74) Attorney, Agent, or Firm—Nixon & Vanderhye P.C.

(57) ABSTRACT

A communications system includes a telecommunications link (3) between a remote terminal (CPa-c) (such as a burglar alarm control panel) and a control station (1). Polling requests are transmitted on a digital messaging channel which is carried by the telecommunications link. The remote terminal (CPa-c) generates a poll response message which is partially encrypted and is returned on the digital messaging channel to the control station where it is decoded.

17 Claims, 21 Drawing Sheets

Fig.7.
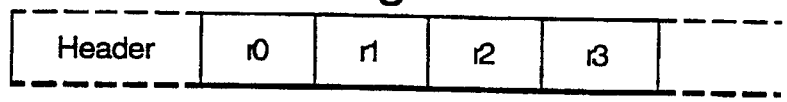
Fig.8.
| MSB | | | | | | | LSB |
|---|---|---|---|---|---|---|---|
| \multicolumn{8}{c}{Protocol Message Type (Poll Response)} |
| 0 | 0 | 0 | 0 | 0 | 0 | 1 | 0 |
| \multicolumn{8}{c}{CPE Identification Number} |
| \multicolumn{8}{c}{(Binary Random Number, 4 octets long)} |
| b | b | b | b | b | b | b | b |
| b | b | b | b | b | b | b | b |
| b | b | b | b | b | b | b | b |
| b | b | b | b | b | b | b | b |
Fig.9.
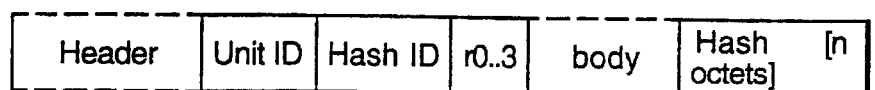

Fig. 10.

| | MSB | | | | | | | LSB |
|---|---|---|---|---|---|---|---|---|
| | Protocol Message Type (Poll Response) | | | | | | | |
| 1 | 0 | 0 | 0 | 0 | 0 | 0 | 1 | 1 |
| 2 | CPE Identification Number | | | | | | | |
| | *(Binary Number, 4 octets long)* | | | | | | | |
| | b | b | b | b | b | b | b | b |
| 3 | b | b | b | b | b | b | b | b |
| 4 | b | b | b | b | b | b | b | b |
| 5 | b | b | b | b | b | b | b | b |
| 6 | Hash Identification (one Octet) | | | | | | | |
| | b | b | b | b | b | b | b | b |
| 7 | Poll Identification Number | | | | | | | |
| | *(Binary Random Number, 4 octets long)* | | | | | | | |
| | b | b | b | b | b | b | b | b |
| 8 | b | b | b | b | b | b | b | b |
| 9 | b | b | b | b | b | b | b | b |
| 10 | b | b | b | b | b | b | b | b |
| 11 | N_NORMAL field, 2 Octets (binary number, 0 to 1023 inclusive) | | | | | | | |
| | b | b | b | b | b | b | b | b (lsb) |
| | Null | | | | | | N_NORMAL | |
| 12 | 0 | 0 | 0 | 0 | 0 | 0 | b (msb) | b |
| 13 | N_ALARM field, 2 Octets (binary number, 0 to 1023 inclusive) | | | | | | | |
| | b | b | b | b | b | b | b | b (lsb) |
| | Null | | | | | | N_ALARM | |
| 14 | 0 | 0 | 0 | 0 | 0 | 0 | b (msb) | b |
| 15 | N_OUTSTAND field, 2 Octets (binary number, 0 to 1023 inclusive) | | | | | | | |
| | b | b | b | b | b | b | b | b (lsb) |
| | Null | | | | | | N_OUTSTAND | |
| 16 | 0 | 0 | 0 | 0 | 0 | 0 | b (msb) | b |
| 17 | N_RESET field, 2 Octets (binary number, 0 to 1023 inclusive) | | | | | | | |
| | b | b | b | b | b | b | b | b (lsb) |
| | Null | | | | | | N_RESET | |
| 18 | 0 | 0 | 0 | 0 | 0 | 0 | b (msb) | b |
| 19 | Number of Alarm Information Fields, 2 Octets | | | | | | | |
| | (Binary number, 0 to 1023 inclusive) | | | | | | | |
| | b | b | b | b | b | b | b | b (lsb) |
| | Null | | | | | | NAIF | |
| 20 | 0 | 0 | 0 | 0 | 0 | 0 | b (msb) | b |
| 21 | Optional Alarm Information Field(s) | | | | | | | |
| .. | | | | | | | | |
| n+1 | Hash Field | | | | | | | |
| | *(Integrity Check [16 octets] on Octets 1 to n inclusive)* | | | | | | | |
| n+2 | b | b | b | b | b | b | b | b |
| .. | b | b | b | b | b | b | b | b |
| n+15 | b | b | b | b | b | b | b | b |
| n+16 | b | b | b | b | b | b | b | b |

Fig.11.

| | MSB | | | | | | | LSB |
|---|---|---|---|---|---|---|---|---|
| | colspan="8" | Protocol Message Type (Telemetry Poll Request) | | | | | | |
| | 0 | 0 | 0 | 0 | 0 | 1 | 0 | 0 |
| 2 | colspan="8" | CPE Identification Number | | | | | | |
| | colspan="8" | *(Binary Number, 4 octets long)* | | | | | | |
| | b | b | b | b | b | b | b | b |
| 3 | b | b | b | b | b | b | b | b |
| 4 | b | b | b | b | b | b | b | b |
| 5 | b | b | b | b | b | b | b | b |
| 6 | colspan="8" | Poll Identification Number | | | | | | |
| | colspan="8" | *(Binary Random Number, 4 octets long)* | | | | | | |
| | b | b | b | b | b | b | b | b |
| 7 | b | b | b | b | b | b | b | b |
| 8 | b | b | b | b | b | b | b | b |
| 9 | b | b | b | b | b | b | b | b |
| 10 | colspan="8" | Hash Identification (one Octet) | | | | | | |
| | b | b | b | b | b | b | b | b |
| | colspan="8" | Length of Addition Information | | | | | | |
| | colspan="8" | (binary value, range 1 to 127 including this Octet) | | | | | | |
| 11 | 0 | b | b | b | b | b | b | b |
| | colspan="8" | Additional Information | | | | | | |
| | colspan="8" | *(Optional, maximum of 126 octets)* | | | | | | |
| 12 | i | i | i | i | i | i | i | i |
| .. | i | i | i | i | i | i | i | i |
| 137 | i | i | i | i | i | i | i | i |
| 138 | i | i | i | i | i | i | i | i |
| n+1 | colspan="8" | Hash field | | | | | | |
| | colspan="8" | *(Integrity Check [16 octets] on Octets 1 to n inclusive)* | | | | | | |
| n+2 | b | b | b | b | b | b | b | b |
| .. | b | b | b | b | b | b | b | b |
| n+15 | b | b | b | b | b | b | b | b |
| n+16 | b | b | b | b | b | b | b | b |

Fig.12.
| | MSB | | | | | | | LSB |
|---|---|---|---|---|---|---|---|---|
| | Protocol Message Type (Non-Secure Poll Response) | | | | | | | |
| 1 | 0 | 0 | 0 | 0 | 0 | 1 | 1 | 1 |
| 2 | Poll Identification Number | | | | | | | |
| | (Binary Random Number, 2 octets long) | | | | | | | |
| | b | b | b | b | b | b | b | b |
| 3 | b | b | b | b | b | b | b | b |
| | Length of Addition Information | | | | | | | |
| | (binary value, range 1 to 127 including this Octet) | | | | | | | |
| 4 | 0 | b | b | b | b | b | b | b |
| | Additional Information | | | | | | | |
| | (Optional, maximum of 126 octets) | | | | | | | |
| 5 | i | i | i | i | i | i | i | i |
| .. | i | i | i | i | i | i | i | i |
| 130 | i | i | i | i | i | i | i | i |
| 131 | i | i | i | i | i | i | i | i |
Fig.13.
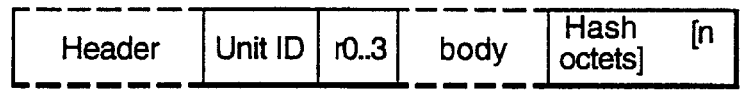
Fig.14.
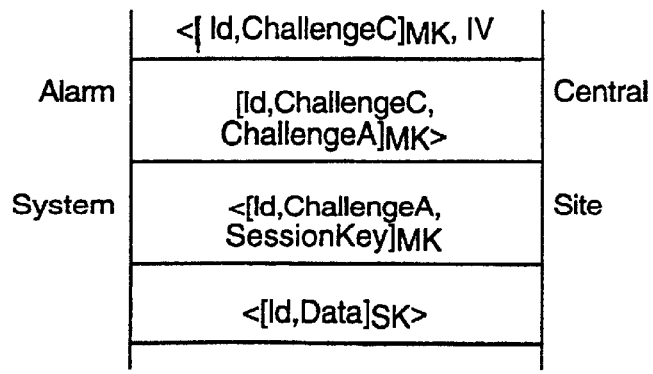

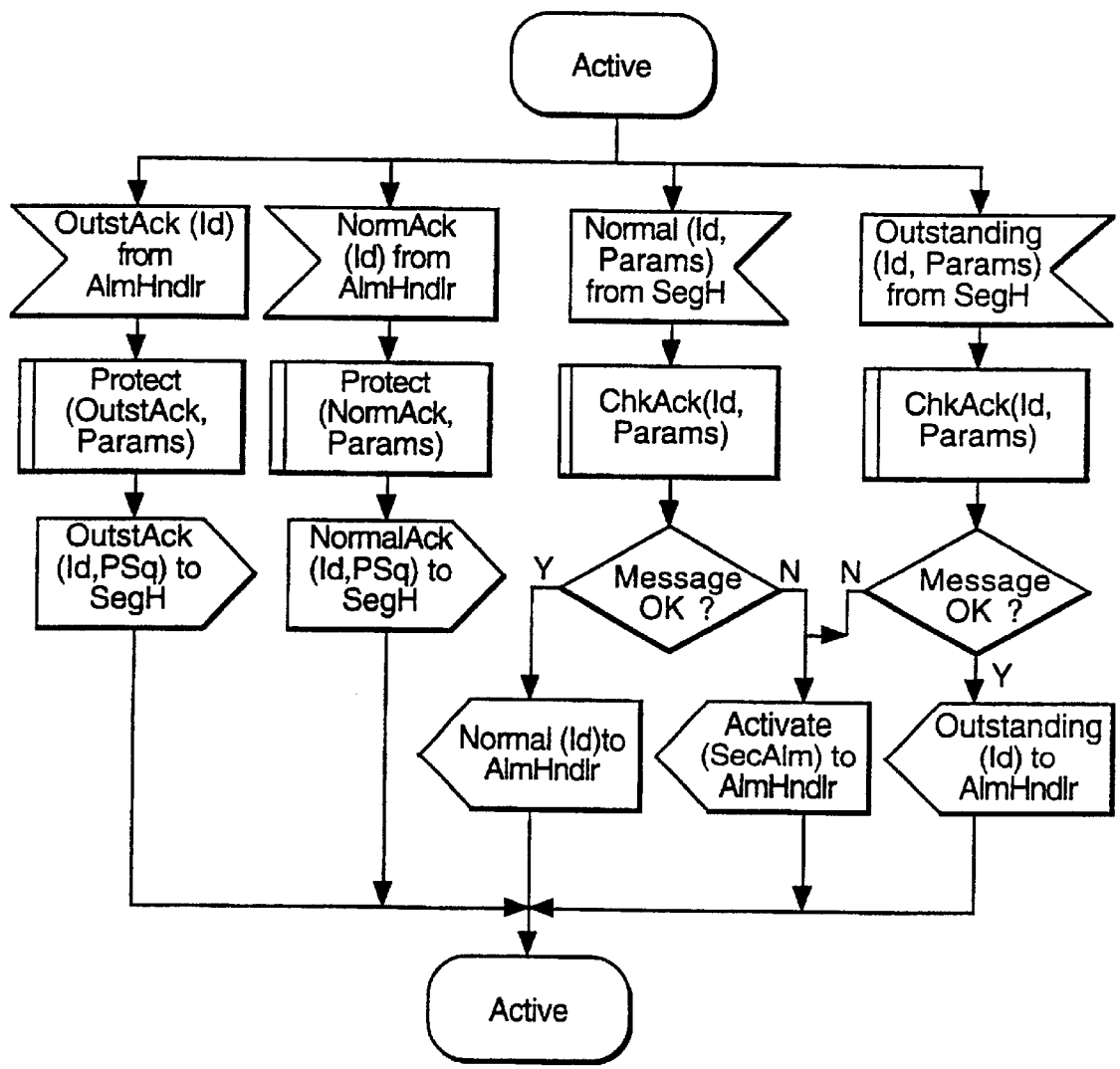

COMMUNICATIONS SYSTEM

BACKGROUND OF THE INVENTION

1. Field of the Invention

The present invention relates to a system for monitoring remote terminal equipment, such as a security alarm, over a telecommunications link.

2. Related Art

There are a number of situations in which it is necessary to monitor at a central site the status of terminals at remote locations. One example is provided by burglar alarm systems of the type which send an alert to a monitoring service. Conventionally, a telephone line has been used to provide the connection between the alarm equipment at the customer premises and the monitoring station. An analogue tone is transmitted on the line to the local exchange and is used for signalling between the alarm and the monitoring station, including the transmission of alarm signals. Such an arrangement provides only a limited degree of protection against attacks intended to defeat a security system. If the tone is interrupted by the line being cut, then this is detected at the monitoring station. The signals transmitted on the analogue link may be encrypted, although in practice any such encryption may be detected and broken over relatively short time scales. Once the code has been broken, then an attack may be made by cutting into the line and substituting a dummy terminal which masquerades as the real terminal. This makes it possible to disable the security system at the customer premises without the monitoring service being alerted.

SUMMARY OF THE INVENTION

According to a first aspect of the present invention there is provided a method of operating a communications system including a telecommunications link between a remote terminal and a control station, the method comprising:

a) transmitting polling requests on a digital messaging channel carried on the telecommunications link;

b) generating at the remote station a poll response message and encrypting part only of the said poll response message;

c) returning a response signal from the remote terminal to the control station on the digital messaging channel; and d) at the control station decrypting the poll response message.

The present invention provides a monitoring system which offers improved security and greater flexibility in operation combined with low transmission overheads. This is achieved by establishing a digital messaging channel between the remote site and the central station, polling the site on the digital messaging channel, and then partially encrypting the polled response. The use of digital messaging makes possible the application of more powerful encryption techniques, and the encryption of part only of the polled response message allows authentication of the poll response at the central station while only adding marginally to the bandwidth required for signalling between the remote station and the central station.

Preferably the digital messaging channel is the D channel of an ISDN circuit.

A further advantage of the present invention is that it is suitable for implementation using standard ISDN technology for the telephone link. In particular, the messaging channel may be integrated with the existing D channel of an ISDN line. The monitoring function can then operate transparently, without interfering with the operation of the ISDN line. The ISDN line is therefore available for simultaneous use, for example, for voice telephony.

Preferably the remote terminal transmits the poll response in a plurality of segments and the central station returns to the remote station an acknowledgement of each segment received and a further acknowledgement for the message assembled from the segments.

This preferred aspect of the invention divides the poll response message into a number of parts each of which is transmitted separately. A handshake is carried out with the central station both for the individual segments, and also for the message as a whole formed by assembling the segments.

Preferably each polling request from the central station includes a different identifying code, and the encrypted part of the poll response includes the identifying code of the respective poll request.

The security of the system is further enhanced by including in each poll from the central station an identifying code or "challenge" which is specific to that particular poll. The remote terminal is then required to include the appropriate "challenge" in the response to the poll. Including the challenge in the encrypted part of the poll response then provides a double layer of security. Encryption with the key belonging to the particular remote terminal serves to authenticate the source of the polled response while the inclusion of the challenge identifying code indicates that the response has been freshly generated in answer to the respective poll. This provides a safeguard against attacks on the security of the system in which genuine poll responses from the remote terminal are intercepted and stored for later forwarding to the central station.

Preferably the telecommunications link includes a local access network which links the remote station to a local exchange. Alternatively, or in addition, some of the polling requests and responses may be transmitted over a wireless communications link which may be, for example, a GSM link.

The present invention is not limited in applicability to systems in which the remote terminal is a burglar alarm, although the high degree of security offered by the invention is particularly advantageous in this context. Other uses for the invention include remote monitoring of meters, for example electricity, gas or water meters, or remote monitoring of the status of an automatic vending machine.

According to a second aspect of the present invention, there is provided a communications system comprising:

a control station including a polling request generator and a decoder for decoding poll response messages;

a remote terminal including a polling response generator for generating a polling response message;

an encoder arranged to encode part only of the polling response message;

a telecommunications circuit including a digital messaging channel which, in use, carries polling requests from the control station to the remote terminal and carries partially encoded response messages from remote terminal to the control station.

According to another aspect of the present invention, there is provided a control station comprising:

a) a digital messaging channel interface which is arranged to transmit and receive messages to and from a remote station on a digital messaging channel;

b) a polling request generator which is arranged to generate a polling request for transmission on the digital messaging channel;

c) a decoder arranged to decode a partially encrypted poll response message which is received on the digital messaging channel; and d) a controller which is arranged to interpret the poll response messages.

The invention encompasses control stations and remote terminals (such a, e.g., a burglar alarm control panel) for use in methods in accordance with the first aspect of the invention.

BRIEF DESCRIPTION OF THE DRAWINGS

Systems embodying the present invention will now be described in further detail, by way of example only, with the reference to the accompanying drawings, in which:

FIG. 7 is a diagram showing the format of a poll request message;

FIG. 8 is a diagram showing the format of an alarm;

FIG. 9 is a diagram showing the basic format of a poll response message;

FIG. 10 is a diagram showing in detail the format of an alarm poll request;

FIG. 11 is a diagram showing the format of a telemetry poll response;

FIG. 12 is a diagram showing the format of a non-secure poll response;

FIG. 13 is a diagram showing the format of acknowledgement messages;

FIG. 14 shows the message sequence used to establish session keys;

FIGS. 21a to 21g are SDL diagrams for the Protocol & Security process of FIG. 19.

DETAILED DESCRIPTION OF EXEMPLARY EMBODIMENTS

A communications system includes a control station 1 which incorporates a data engine DE. Data is received at the data engine via local exchanges LE1, LE2 of a telecommunications network 2. The local exchanges are linked by ISDN lines 3a, 3b, 3c to remote terminals, 4, at different customer premises CPa, CPb, CPc. A number of different local exchanges are linked via a data access network to the control station 1. Although for the purposes of illustration only three customer premises are shown, in practice, many more terminals may be linked to a particular control station. The present example can accommodate 1024 individually addressable units at each of the customer premises. In this example the remote terminals 4 are the control panels of security alarm systems arranged to communicate with an alarm monitoring centre via the control station 1. The terminals 4 are also referred to herein as "customer premises equipment" (CPE).

The ISDN connections between the customer premises and the local exchange use the ISDN D channel for traffic relating to the alarm system. The alarm data communication operates transparently to the user, so that the ISDN channels remain available for voice telephony and/or other data transmissions.

Figure 1A:
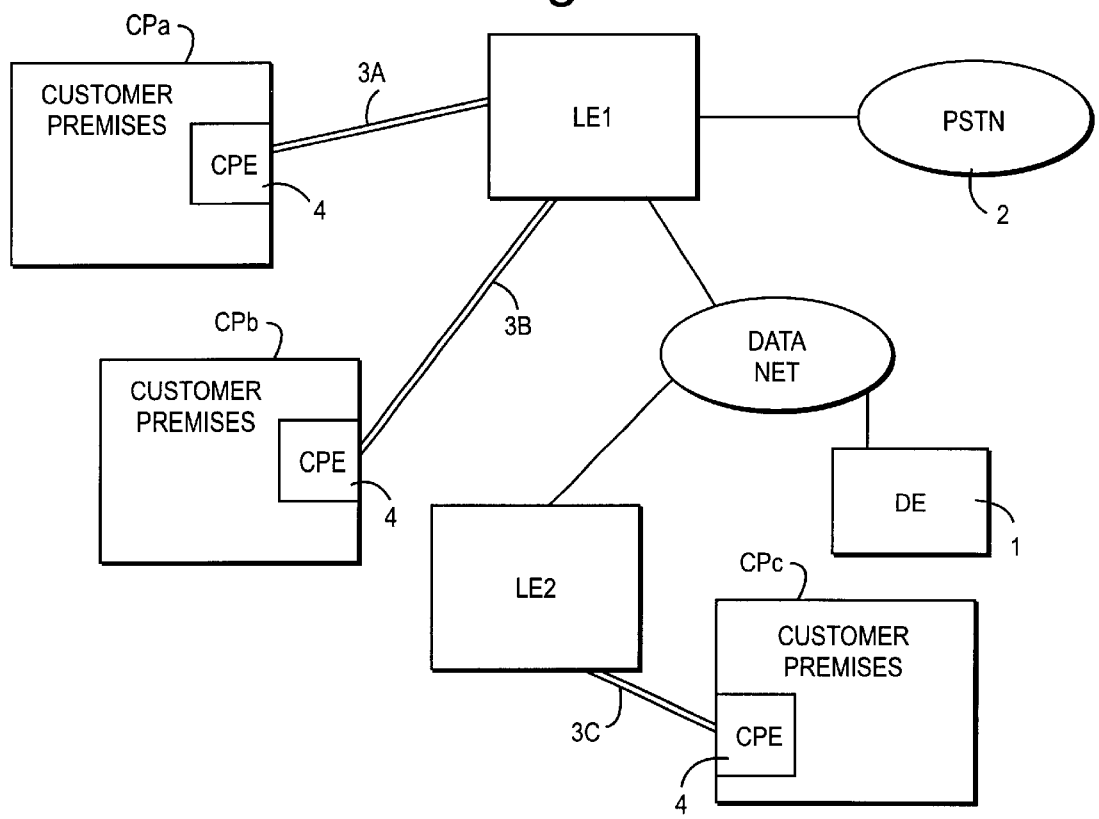
FIGS. 1a and 1b are schematics of systems embodying the present invention.
Figure 1B:
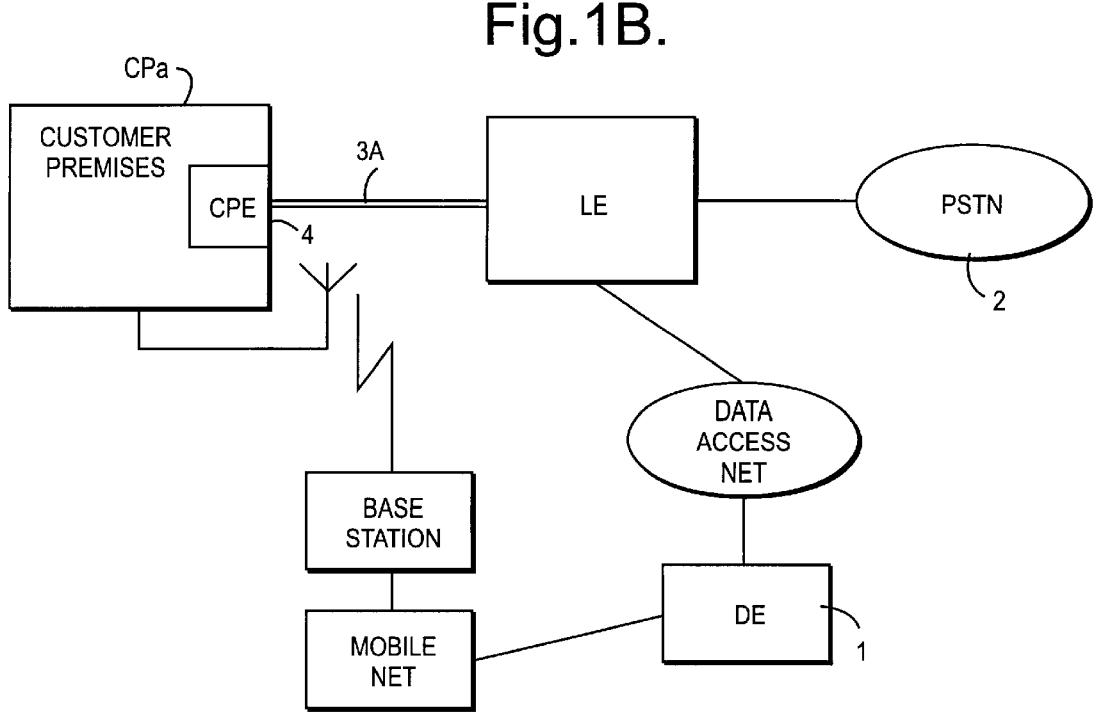

In FIG. 1B, in addition to using ISDN connections via a fixed network, the system includes a back-up connection between the remote terminal 4 and the control station 1 which uses a GSM mobile telephony network. Specifically, the connection is formed using the GSM short messaging service (SMS) to provide the required digital messaging channel.

It will be understood that the present invention can be applied to a variety of different network topologies, and the two networks illustrated are chosen by way of example only. One further alternative is the application of the invention in a network in which access to/from the customer premises is entirely based on a mobile telephony system, such as GSM.

Figure 2:
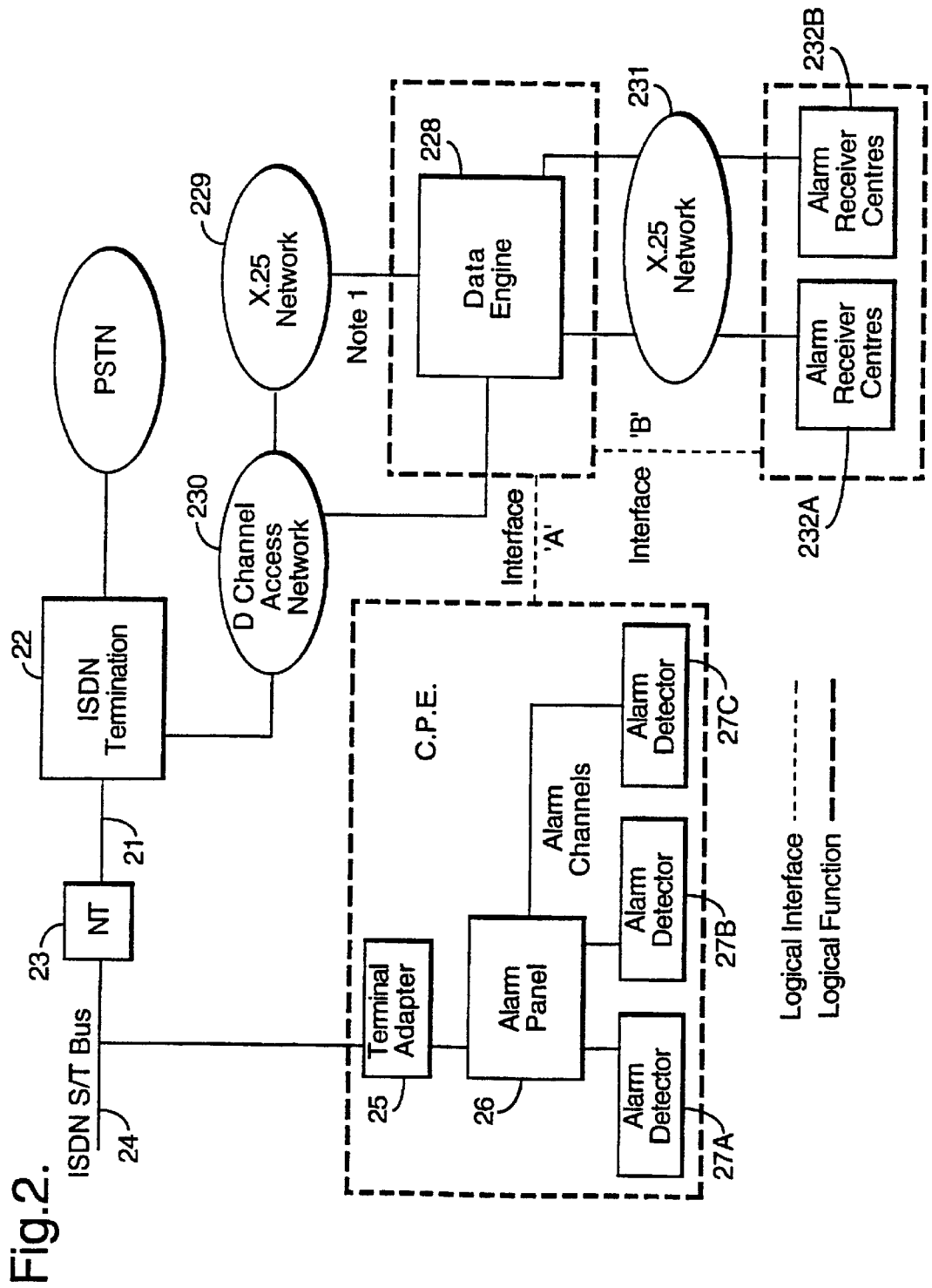
FIG. 2 is a schematic showing the functional interfaces in the systems of FIG. 1.

FIG. 2 shows in further detail the components making up the system of FIG. 1. An ISDN line 21 terminates at the local exchange in an ISDN termination 22, and terminates at the customer premises in an NT-1 (Network Termination 1) device 23. In this example, the ISDN line is a BRI (Basic Rate Interface) line comprising two 64 kbps bearer (B) channels for voice or data, and one 16 kbps data (D) channel. The NT-1 converts the two-wire interface of the ISDN line to a 4 wire S/T interface. An S/T bus 24 connects the NT-1 to the CPE, and may also connect other devices such as an ISDN modem (not shown). In the CPE, terminal adapter 25 provides a duplex connection to the S/T bus. A control processor 26 located in an alarm panel receives data from a number of alarm detectors 27 a–c. The alarm detectors may include, for example, motion sensors to detect intruders, and smoke detectors to detect fire. The alarm panel and alarm detectors, other than in their manner of communication with the control station, are entirely conventional in construction and operation and so will not be described further here.

From the local exchange, signals to or from the ISDN termination 22 are communicated via a data access network to the data engine 28. The data engine 28, which operates in accordance with the protocol described in further detail below, may, as in the example illustrated in FIG. 3, run on a platform comprising a number of UNIX workstations, such as those available commercially as Sun UltraServers II. The connection from the ISDN termination to the data engine 28 may be way of an X25 (packet switching) network 229 or alternatively by way of a dedicated D channel access network 230. In layer 2 of the D-Channel protocol, the service access point identifier is set to a value which indicates the use of a packet access service.

Figure 3:
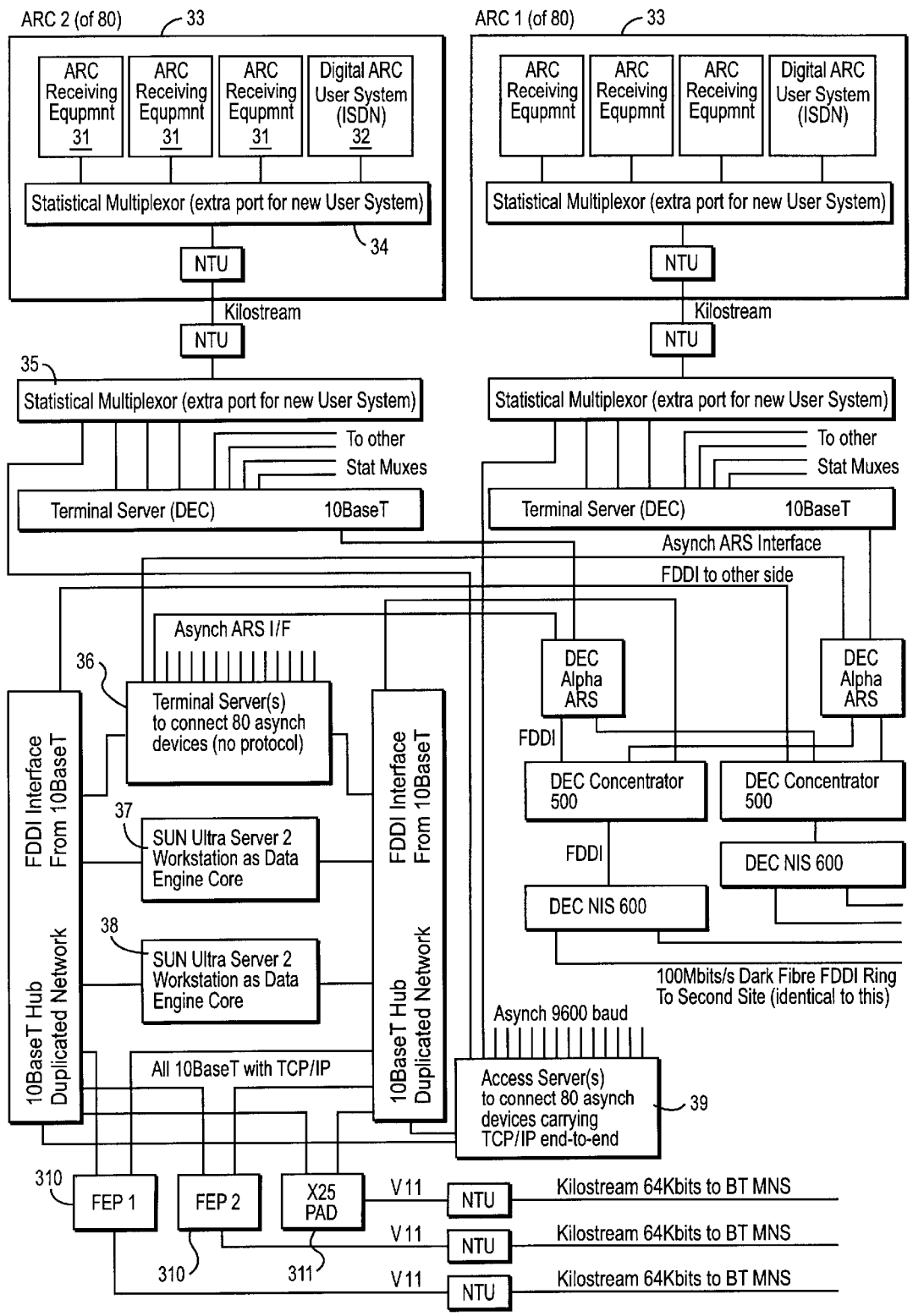
FIG. 3 is a detailed schematic of equipment for implementing the control station of the system of FIG. 1

In the example shown in FIG. 3, the data engine is incorporated in a platform which also handles alarm signals from conventional analogue systems. Incoming signals on Kilostream channels are received at front-end processors 310 and pass on a 10BaseT network to the data engine core servers 37, 38. An access server 39 allows communication with platforms at other sites using, in this example, TCP/IP protocols. Signals may also be communicated via this TCP/IP interface with other networks, such as a mobile telephony network. Signals from the data engine pass via a terminal server 36, which in this example is a DEC Alpha ARS, and a multiplexer 37 onto a kilostream link. The kilostream link connects the data engine to a respective one of a number of alarm receiver centres (ARC). In this example, the ARC 35 includes both analogue alarm receiving equipment 31 and a digital user system 32. It is this latter digital user system 32 which handles alarm calls generated by the data engine.

When an alarm signal generated by CPE (customer premises equipment) is received at the data engine, this is passed on via an X.25 network 31 to the appropriate one of a number of alarm receiver centres 32a, 32b. In use, the data engine 28 generates polling request signals at regular intervals. These are transmitted via the ISDN line to the CPE. The CPE responds with a call response message which indicates either that there has been no change in the status of the alarms, or that there has been a change and the nature of the change. As further described below, the poll response message generated by the CPE includes an encrypted signature generated using a hash function. Included in the encrypted signature is the challenge sent by the data engine in the relevant poll request.

Figure 4A:
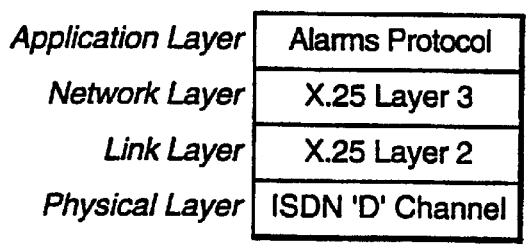
FIGS. 4a and 4b show alternative protocol stacks used in systems embodying the invention.
Figure 4B:
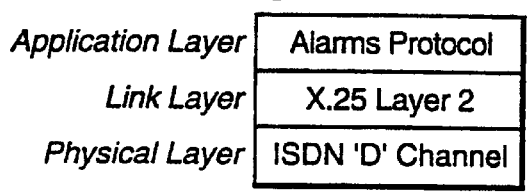

FIG. 4a shows one example of a protocol stack for the system illustrated in the preceding figures. As discussed above, one option is that data should be transferred from the ISDN line across a X.25 network. The other option is to connect the data engine directly from the "D" channel access network. This option however then does not provide such functions as segmentation and reassembly of information blocks which are too large to fit into one message. Where this option is adopted, then as shown in FIG. 4b, an X.25 layer 3 may not be present since the access network only terminates layer 2. The data engine then implements a simplified X.25 network side (layers 2 and 3) as an option to cater for the direct connection to the access network. Two typical protocol stacks are shown in FIG. 4, demonstrating the flexibility of the alarm protocol in functioning with different protocol stacks in different environments.

The following description sets out the protocol for the functional interfaces A and B illustrated in FIG. 2 taking into account the services that the X.25 layer 2/3 provides.

The protocol used for the interfaces to the data engine is designed to be robust, secure and efficient. The data engine is required to be able to determine if the CPE is still operating effectively, and to determine that it has not been interfered with. This is achieved through a polling mechanism, such that the data engine (DE) connects to the CPE and interchanges a simple status message. The polling rate in this example is every 8 seconds ($T_{711}$). To support this, a permanent X.25 connection must be made. Failure to gain an acceptable response from the CPE is reported only after a configurable number of polls ($N_{711}$) at intervals of $T_{711}$ and after a further single period of $T_{711}$. This delay is such that the report is generated in 40–90 seconds. A total of 5 unsuccessful poll attempts would result in a report to the alarm receiver centre (ARC) between 40–48 seconds after a customer line has been cut. The CPE is not considered to be sending reliable (and therefore reportable) information until it has correctly responded to a predetermined number ($N_{712}$) polls. In this example $N_{712}$ has the value of 2.

The DE differentiates between a number of different types of failures including network congestion; invalid response; and failure to connect. These different types of failure require different degrees of urgency at the ARCs and this is reflected in the protocol at interface B. The DE classifies the CPE as being in one of three states: decommissioned (alarms are disabled); active (the normal state); and CommsFailed (when the CPE has failed to respond to $N_{711}$ poll attempts).

The protocol is message based and reports on individual alarms only when a change of state occurs. The protocol is able to identify uniquely 1024 different alarms from each individual (addressable) CPE. Each alarm may be in one of four states: normal (inactive); alarm (alarm channel activated); outstanding (registered at ARC); and reset (alarm channel deactivated). The alarm and reset states are used to indicate that the change of status has been registered at the DE but not yet confirmed at the ARC. The progression of alarms between these states is controlled by the ARC the DE and the CPE. The protocol is responsible for carrying the information and for the orderly progression through these states.

To allow some remote fault diagnosis, a simplified (non-secure) message and acknowledge is implemented for decommissioned CPEs.

All interactions between the DE and the CPE are acknowledged as are all interactions between the DE and the ARC. The DE re-sends information to the ARC after timer $T_{702}$ has expired, normally after 60 seconds. There is no limit to the number of times it will be reported to the ARC if an acknowledgement is not received.

Figure 5A:
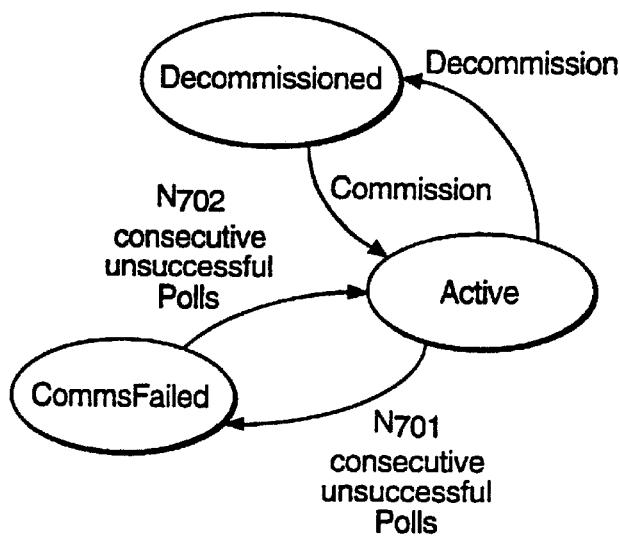
FIGS. 5a and 5b are state transition diagrams.
Figure 5B:
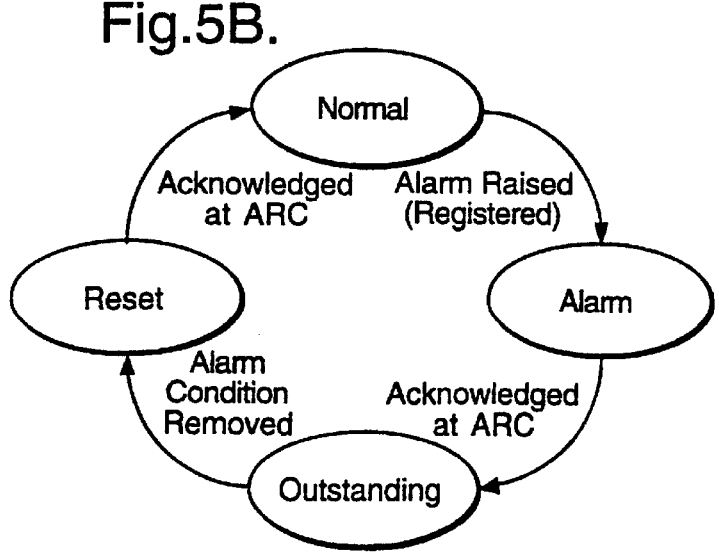

When the CPE has been unreachable and classified at the DE as "CommsFail" it is not treated by the DE as being reliable unless two consecutive poils have been successful. FIGS. 5a and 5b are state transition diagrams illustrating the state transitions discussed above.

Figure 6:
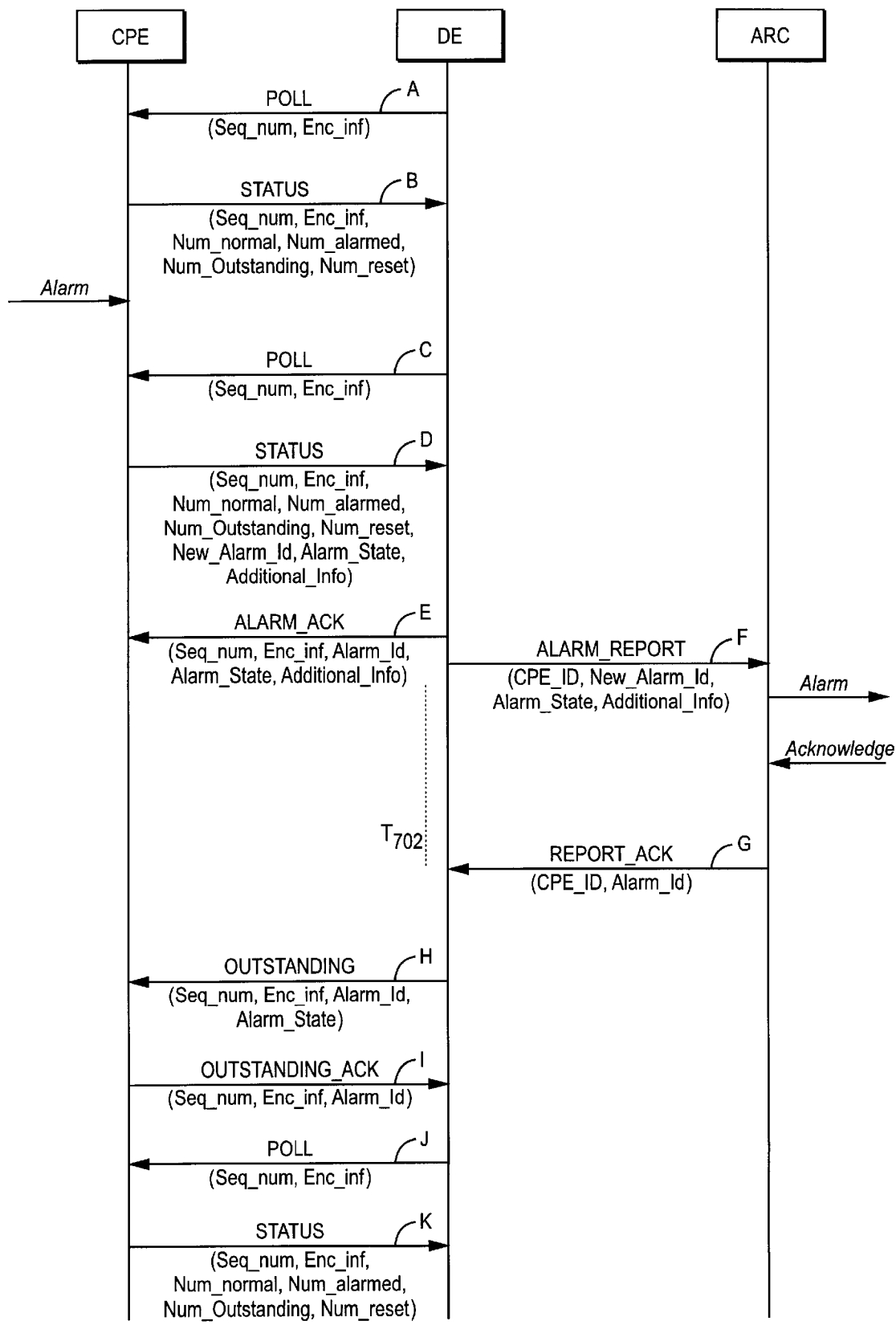
FIG. 6 is a message flow diagram illustrating the operation of the system when an alarm state arises.

The system embodying the present invention minimises message lengths by exchanging details of alarms only when a change of state occurs. Under static conditions, the CPE reports only the number of alarms currently in each state. However, when an alarm changes state, this is reported to the DE (as part of the regular poll) identifying the alarm channel and its new state. The DE then acknowledges the alarm and subsequent polls only report the number of alarms in each state. FIG. 6 shows an example of information flows illustrating this process.

An important feature of the system described above is its ability to provide a high level of security. In particular it address the risks arising from the fact that the system uses part of the PSTN access network which is vulnerable to interception.

Five specific threats to the security of the system have been identified:

T1—the communications line is cut to isolate the alarmed system from the central site.

This is the simplest form of attack where the wires connected the alarm system to the central monitoring site are cut.

T2—the communications between the alarm system and the central site are intercepted and the messages modified in transit.

For example the "normal" and "alarm" fields are adjusted to their quiescent values, thus disguising the operation of an alarm circuit.

T3—the line is intercepted and a unit inserted to masquerade as the alarm system.

This is a variant of T2 but the inserted unit acts as the alarm system, continually reporting a "no change".

T4—the line is intercepted and a unit inserted to masquerade as the central site.

In this case the attack is to issue commands that would disable (or decommission) the alarm system. It may also try to cycle rapidly an alarm system from an alarm state back to the normal state by replaying earlier "poll" and "acknowledge" messages.

T5—the line is monitored that so than an attacker can determine when the alarm system is decommissioned. This is the only threat which relates directly to the ability of an attacker to read communications on the link between the remote site and the DE. An attacker may take advantage of knowing when an alarm system was switched off.

The threats enumerated above are dealt with in the present system by the following counter measures:

C1—polling the alarm system at frequency intervals.

By polling the CPE equipment on a regular basis the system can detect if the communications circuit is broken (or the CPE unit disabled).

C2—using a cryptographic integrity check on all acknowledgement messages.

If the poll response is cryptographically signed, then any attempted modification of the message, (e.g. to conceal an alarm entering the "alarm" state), will be detected. This applies to all acknowledgement message that change the state of the alarm systems.

C3—cryptographic binding of a poll response to the specific poll request.

If the poll response message is bound to the request message (e.g. using a sequence number or "challenge"), then a successful attack cannot be made by replaying earlier messages in an attempt to conceal a change in state of the alarm system.

C4—encryption of sensitive commands.

If messages such as "decommission" are encrypted, then an eavesdropper is unable to determined the exact state of the alarm equipment. It is important that the behaviour of the equipment and the size of the command message does not leak this information. For this reason the CPE is arranged still to respond to polls when decommissioned, and the command message size is the same for all command messages.

C5—mutual authentication.

Whenever a security critical command is being carried out, e.g. decommissioning an alarm unit or downloading a new session key, then the alarm equipment confirms the identify of the central site before acting on the command.

In combination, these counter measures protect the system from the threats listed above. Table 1 below shows the relationship between the enumerated threats and counter measures. The effectiveness of the counter measures relies upon the secrecy of the encryption keys. For good security, the keys are changed on a regular basis. To facilitate this a master key, session key hierarchy may be used. Here the master key is used infrequently (reducing its exposure), while the session key is used for the bulk of the work. New session keys are distributed on-line, protected by the master key, and changed on a regular basis with minimum administrative overhead. It is important then that the session keys are changed regularly, for example on a monthly basis and that all keys for different CPEs should be unique.

Encryption is effected using, in this example, the MD5 hash algorithm specified in RFC1321, "The MD5 Message-Digest Algorithm", MIT and RSA Data Security, Inc. The system uses a master key size of 12 octets (96 bytes) and a session key size of 8 octets (56 bytes). The MD5 hash algorithms specified in the RFC is unkeyed. In order to use it in a keyed fashion some additional processing is necessary. In this example this is carried out using the HMAC function defined:

$$HMAC_{sk}(x) = F(sk, pad_1, F(sk, pad_2, x))$$

Where:

F( ) is the MD5 algorithm sk is the Session Key $pad_1$ is the byte 0x 36.

$pad_2$ is the byte 0x 5C.

x is the message over which the hash is calculated.

MDF works on 512 bit blocks (64 octets). In each instance of F( ) above the session key sk is padded to 512-bytes by replicating the specified pad nbit as many times as is necessary. The 64 byte sequence (sk, $pad_2$) is prepended to the message x. The total message is then hashed using MD5. Finally the 64 byte sequence (sk, $pad_1$) is prepended to the 16 byte output of the previous hash and the resultant 80 bit block MD5 is hashed to produce the 16 byte hash value to be appended to the message x. A saving in computational time can be achieved by precomputing f(sk, $pad_1$) and f(sk, $pad_2$) and saving them along with the session key.

When an encryption function is required, the data is encrypted by "exclusive-OR"ing it with a sequence of bytes generated by a single operation of the hash function. The MD5 hash function operates on a 512 bit (64 byte) input block. The input block is built by concatenating: the master key (12 bytes); an initialisation vector (8 or 16 bytes); and a replicated pad character (0x5C).

Random numbers are required for session keys, for the random challenges included in poll requests, and for initialisation vectors. The system maintains a circular buffer 512 bytes in size at the central site, and buffers 16 bytes in size at the alarm sites. A random "RND( )" function supplies the next n bytes from this buffer every time it is called, with the pointer wrapping around to the start whenever the end of the buffer is reached. Conveniently, the random-buffer is updated using the same MD5 algorithm which is used for hash generation. The MD5 function is modified to include a pointer into the random buffer. Following the completion of round 3 of the MD5 hash process, the first 13 bytes of the internal 16 byte buffer are XOR'd into the random buffer commencing at the point indicated by the internal pointer. The pointer is updated to point at the next point to be modified. Table 2 is a code listing for the random function.

FIG. 7 shows the format of the PollRequest message which is transmitted from the data engine to the CPE. The PollRequest includes a challenge that the CPE is required to include in the response. If the challenge were to be predictable, then the system would be vulnerable to a "man in middle" attack. This might be guarded against by integrity checking the PollRequest packet, although this adds significantly to the packet size and processing overhead. The present implementation therefore uses a random challenge rather than a predictable challenge. The size of the challenge depends on the frequency of key changes and it must not repeat within the lifetime of a session key. It is also necessary to ensure that an attacker cannot accumulate a reasonable full set of responses within a practical time scale through direct polling of the alarm system. In the present embodiment, using a polling frequency of one a second, a 16-bit challenge would be exhausted after 18 hours. By contrast, a 32-bit challenge would be exhausted after 136 years. Accordingly a binary field of 4 octets (32 bits) is used for the challenge.

The CPE generates three types of PollRequest. The alarm poll request has the format shown in FIG. 8 and is sent to the CPE to initiate an update on the status of alarm interfaces within the alarm unit. This message is not encrypted or otherwise protected, other that in the poll identification number of "challenge" is a random number.

A second PollRequest type is the telemetry PollRequest (TPoll). This is sent by the data engine to request data from a telemetry application interface within the CPE. The message is not encrypted, but a hash field is provided to protect the integrity of the message, preventing interception and alteration. A random challenge is included, and the message also includes fields for additional information for use with the telemetry application.

A third type of PollRequest is the non-security PollRequest (SPoll). This is sent by the data engine to request data from an application interfaced within the CPE but does not carry sensitive information. For example, this might be used in an application monitoring the status of a vending machine.

FIG. 9 shows the basic format of a poll response message. The integrity of the poll response packet is checked to guard against modification. This is done by appending a keyed cryptographic hash of the message to the end of the message. The message body includes the challenge sent in the PollRequest and includes an octet identifying the hash function used. The hash function produces, in this example, a 128-bit output (16 bytes) although a subset of the output may be used to reduce the transmission overhead although there is then some loss of relative security.

When a decommissioned alarm system responds to a PollRequest the status of the alarm system "commissioned or decommissioned" is also signalled in the response. As this is sensitive information it is embedded in the hash—either in its generation (through using the inverse of the session key) or by selecting a different set of output bytes, should less than 16 bytes be appended to the message. For security it is necessary that the decommissioned alarm system should signal its state to the central site—either by not replying to a PollRequest message, or by using a modified hash.

FIG. 10 shows in further detail the format of the alarm PollRequest.

FIG. 11 shows the format of the telemetry poll response sent in response to a telemetry poll request message.

FIG. 12 shows the format of the non-secure poll response message. This is sent to the data engine from applications at the CPE which do not carry information requiring protection. Unlike the previous poll responses, this type does not require a hash function to protect message security.

FIG. 13 shows the format of acknowledgement messages. These are used to cycle the state of the alarm equipment following changes signalled in the data fields of poll response messages. The integrity of these acknowledgement messages is protected by the inclusion of the hash function.

FIG. 14 shows the message exchange system which is used for the passing of session keys. The sequence is designed so that an alarm system only accepts such session keys from the central site. Similarly, any command that causes a security-relevant change of state (such as decommissioning) is only accepted if it originates from the central site. The message exchange system is designed to verify the identity of each end of the communications link. In the message sequence shown in the figure, Id is an octet identifying the message type. Challenge X is a random number used as a challenge. IV is an random initialisation vector. The session key is an 8 octet session key to be used for subsequent communications between the alarm system and the central site. Data is up to 15 octets of data which is specific to the alarm unit. [$x_k$ implies encryption of the field x using the encryption key k.]

Figure 15:
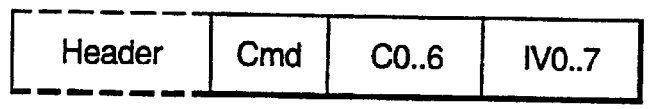
FIG. 15 shows the format of an initial message sent to an alarm unit.

FIG. 15 shows in further detail the initial message sent by the central site to the alarm unit. Cmd is a single octet identifying the command, C-6 are 7 octets of a challenge and IV0 . . . 7 are 8 octets of random data sent in clear. The [CMD] [C0 . . . 6] fields are encrypted using the master key and the IV field.

Figure 16:
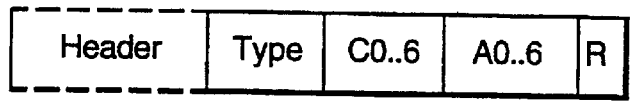
FIG. 16 shows the message returned in response to the message of FIG. 15.

FIG. 16 shows the alarm unit challenge returned in response to the command challenge. Type identifies the alarm unit challenge, C0-6 are the 7 octets of response, A0-6 are 7 octets of challenge from the alarm unit and R is a random octet for padding. The 16 octets from 'Type' to R are encrypted as described above using the master key and previous message (16 octets) as an initialisation vector (IV).

Figure 17:
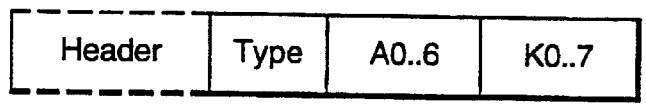
FIG. 17 is a diagram showing the format of a response from the central site.

FIG. 17 shows the central site response. K0-7 are 8 octets of the new session key (or random data if this is not a session key update).

Figure 18:
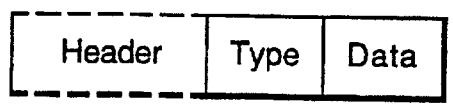
FIG. 18 is a diagram showing the alarm site response.

FIG. 18 shows the alarm site response. Type is an octet identifying the alarm site final response data are up to 15 octets data specific to the alarm unit. These 16 octets are encrypted using the session key and the previous encrypted message as an initialisation vector.

FIG. 6 shows one example of information flows between the CPE, data engine (DE) and ARCi n the case where a new alarm is reported by the alarm detectors connected to the CPE. Message a is a first PollRequest sent from the DE to the CPE. Message b is the response from the CPE to the first poll. At this point there has been no change in status, and so the response simply records the number of alarms in the different respective states. After message b, the alarm message is received by the CPE from the alarm detector. Message c is the first PollRequest sent to the CPE following the alarm. This time the response, message d, includes in addition to the usual status data, data which identifies the identity of the new alarm, the alarm state, and any additional information returned by the alarm equipment in the CPE. In response, the DE returns an alarm acknowledgement, message e. Message f is an alarm report transmitted from DE to ARC, the ARC returns a report acknowledgement message, message g. The DE then transmits message f notifying the CPE that the alarm condition has been acknowledged by the ARC. This changes the status of the alarm to "outstanding". Message i is sent in acknowledgement. Message j is the next of the periodic PollRequests. Message k is the response to the PollRequest returning the status of the alarms at the CPE.

Table 3 below lists the timer and counter values used in the protocol described above.

Figure 19:
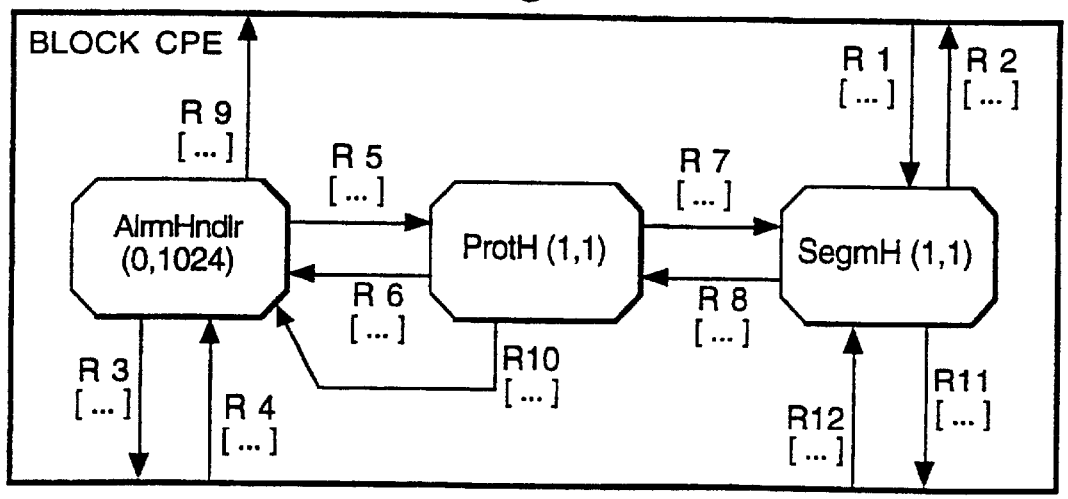
FIG. 19 is a diagram showing the architecture of the software used to implement the customer premises equipment in the system of FIG. 2.
Figure 20A:
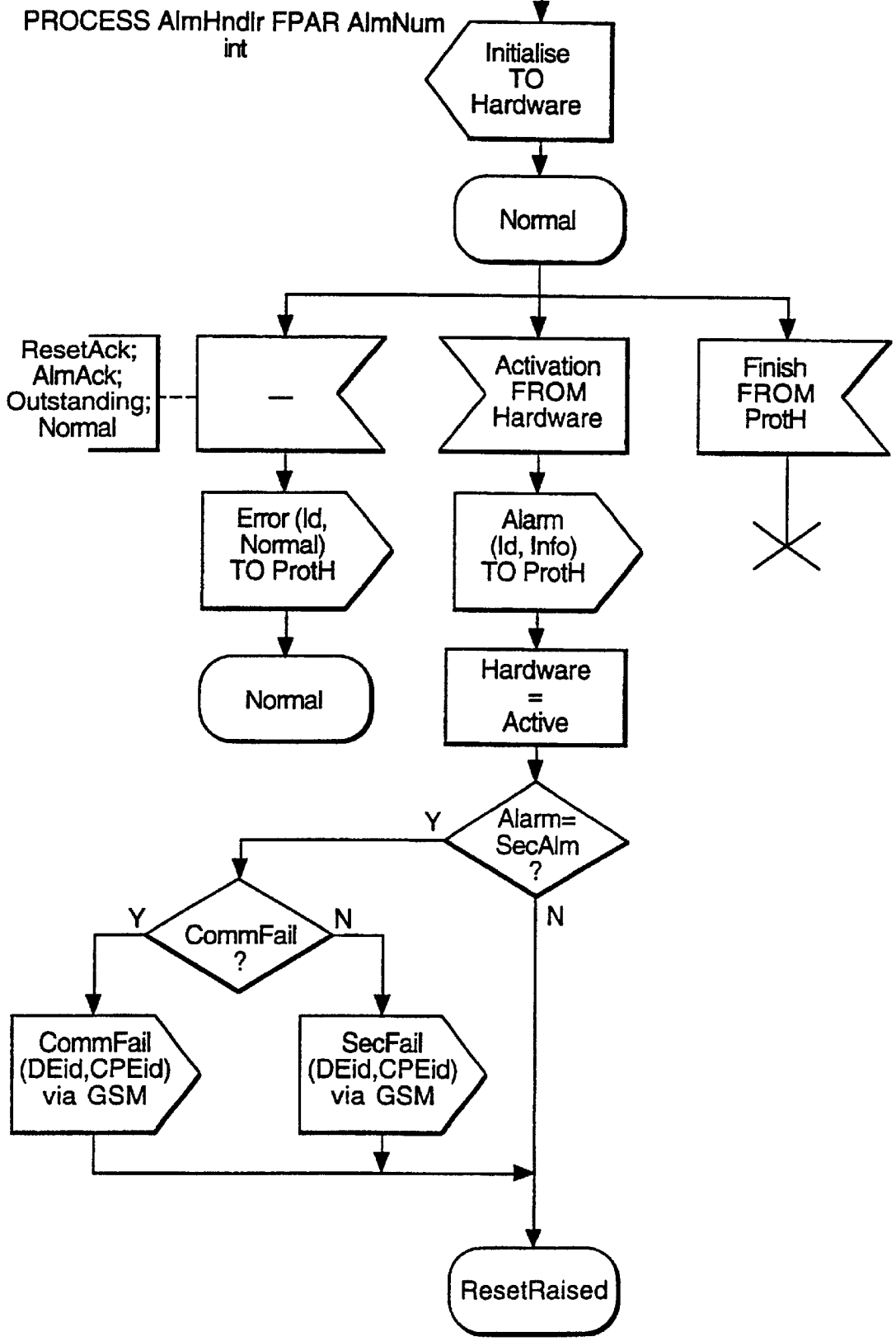
FIGS. 20a to 20d are SDL diagrams for the Alarm Handler process of FIG. 19.
Figure 20B:
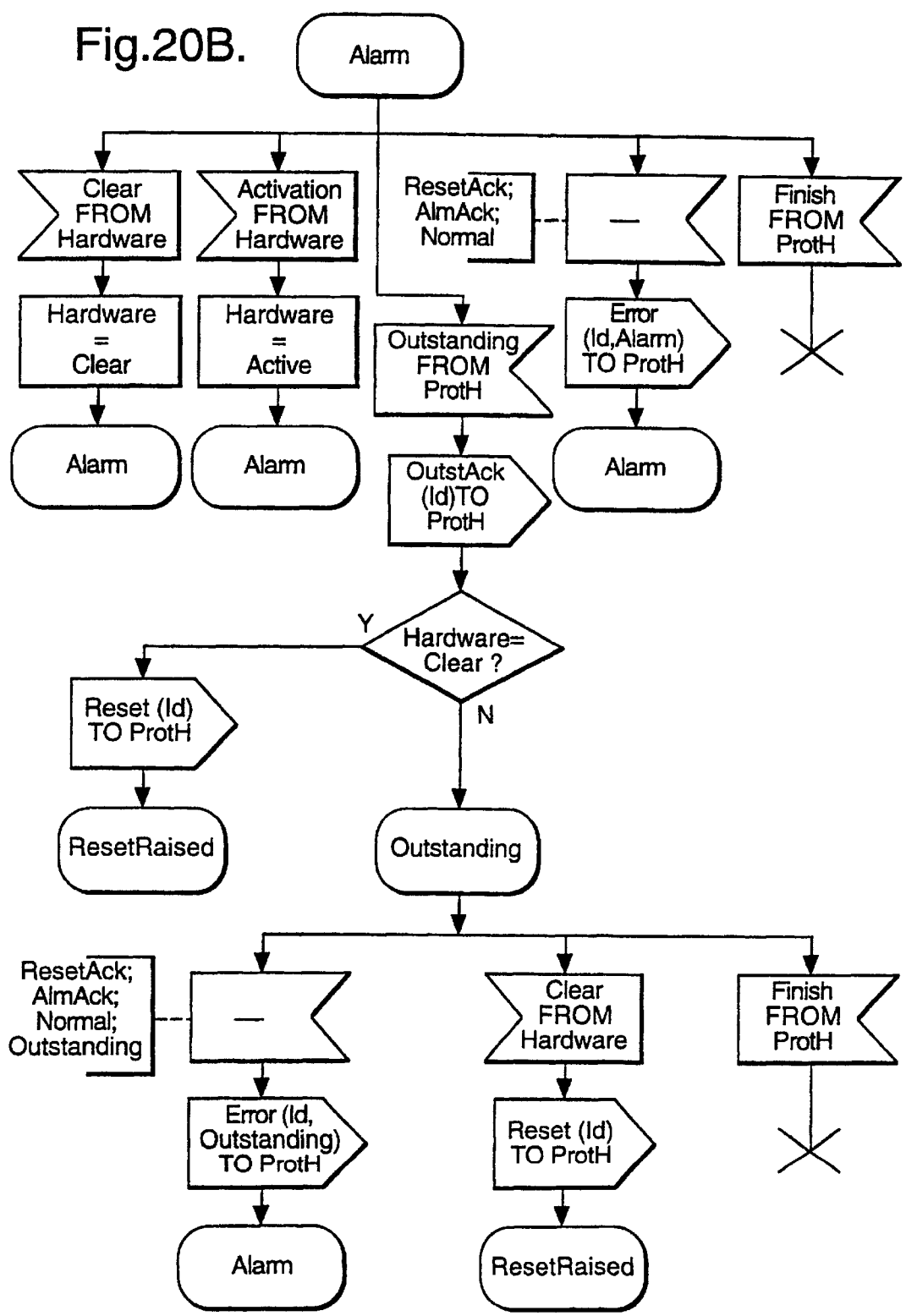
Figure 20C:
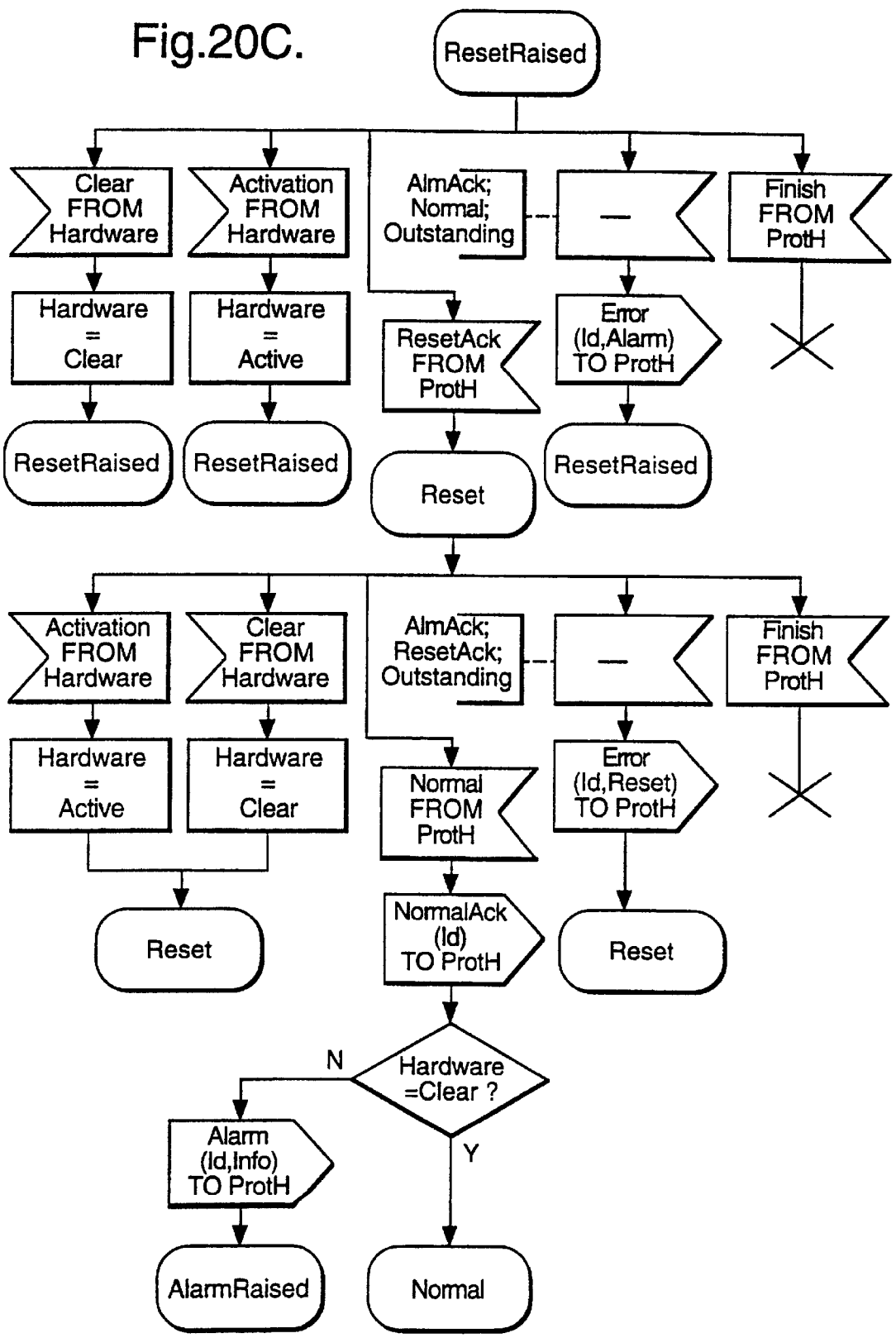
Figure 20D:
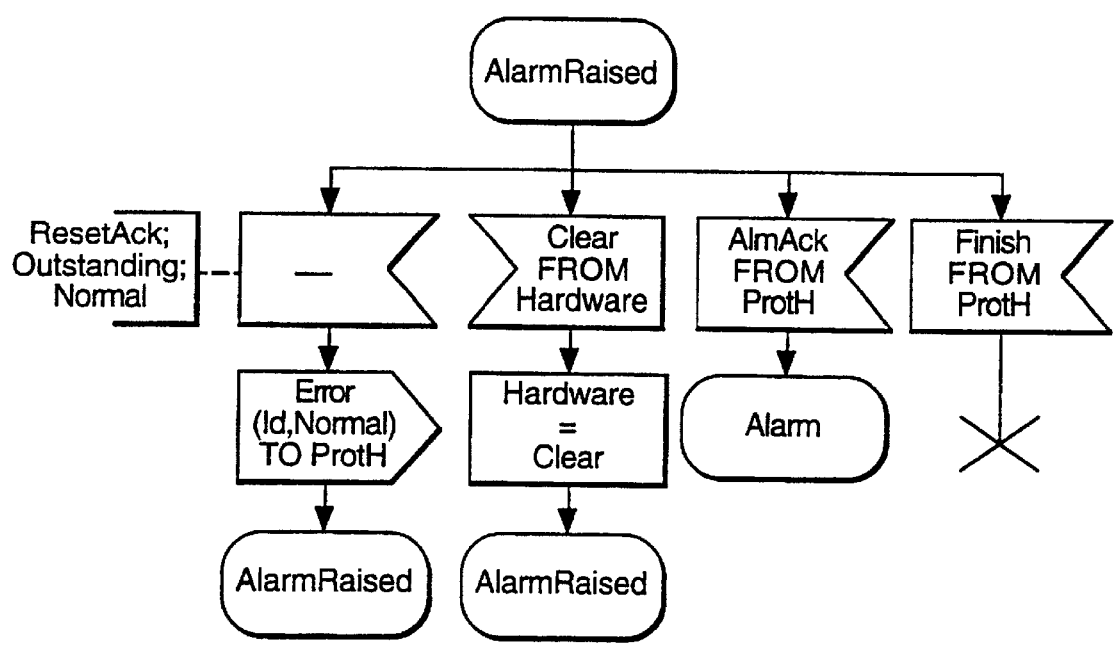
Figure 21A:
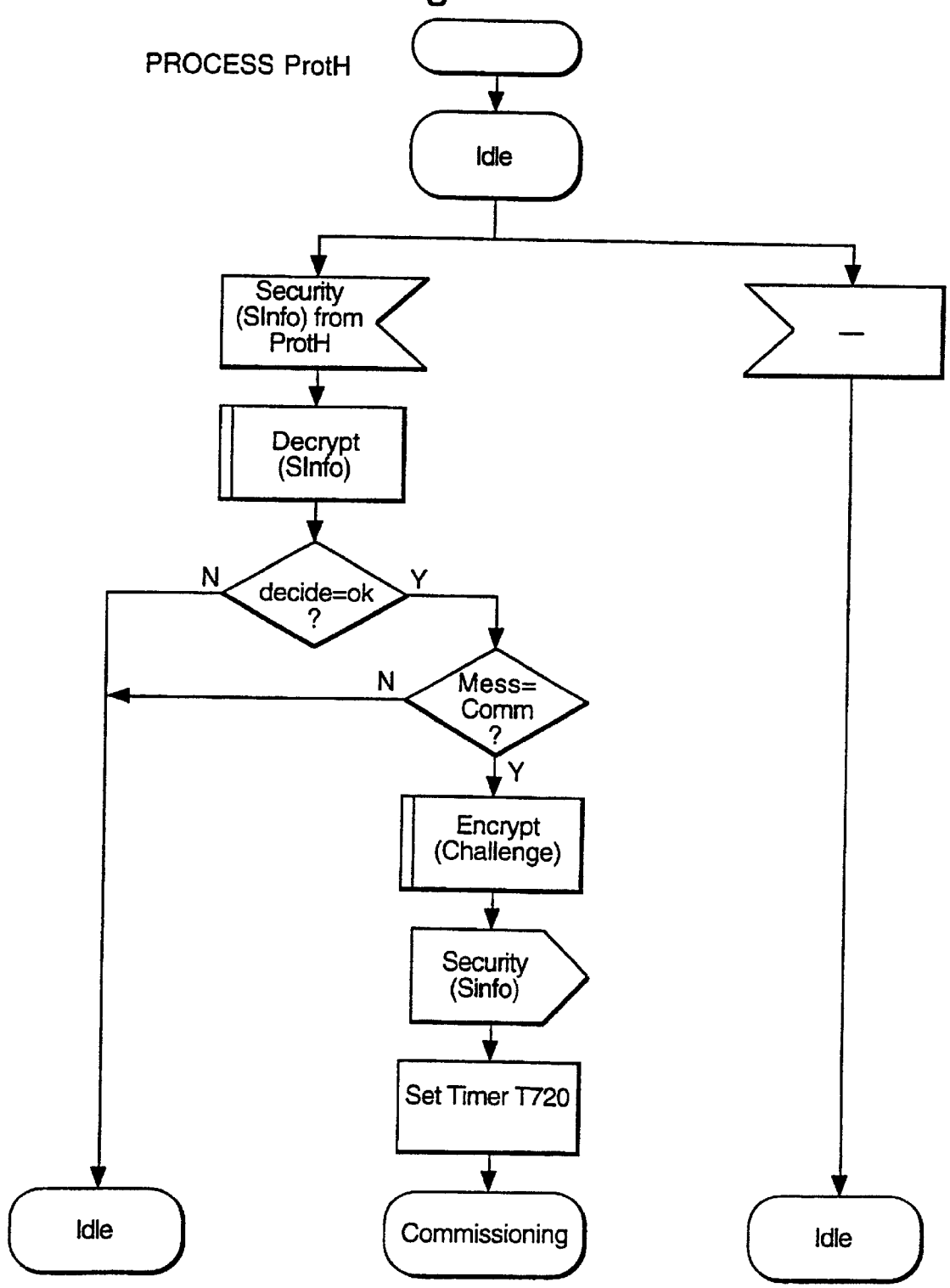
Figure 21B:
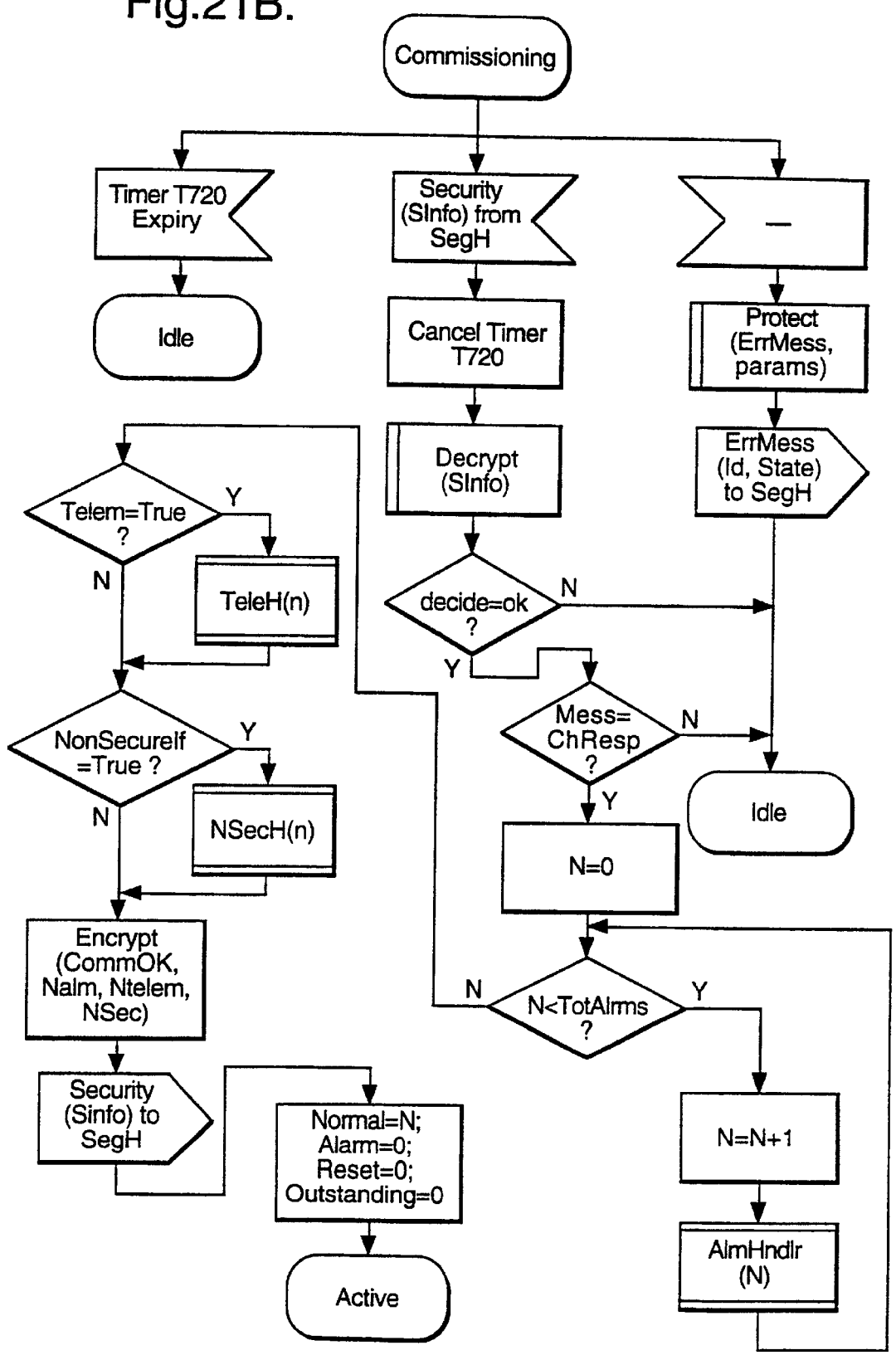
Figure 21C:
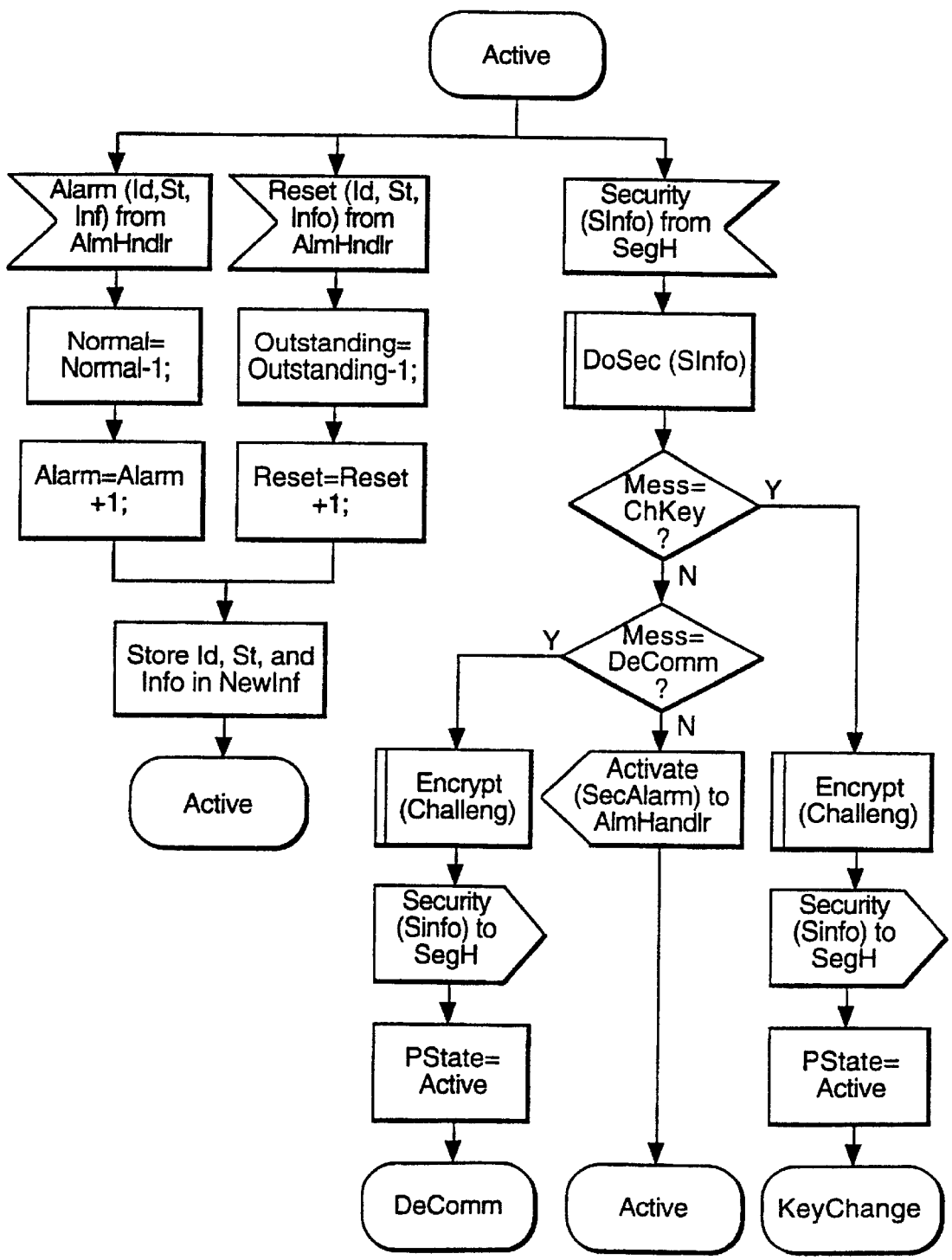
Figure 21E:
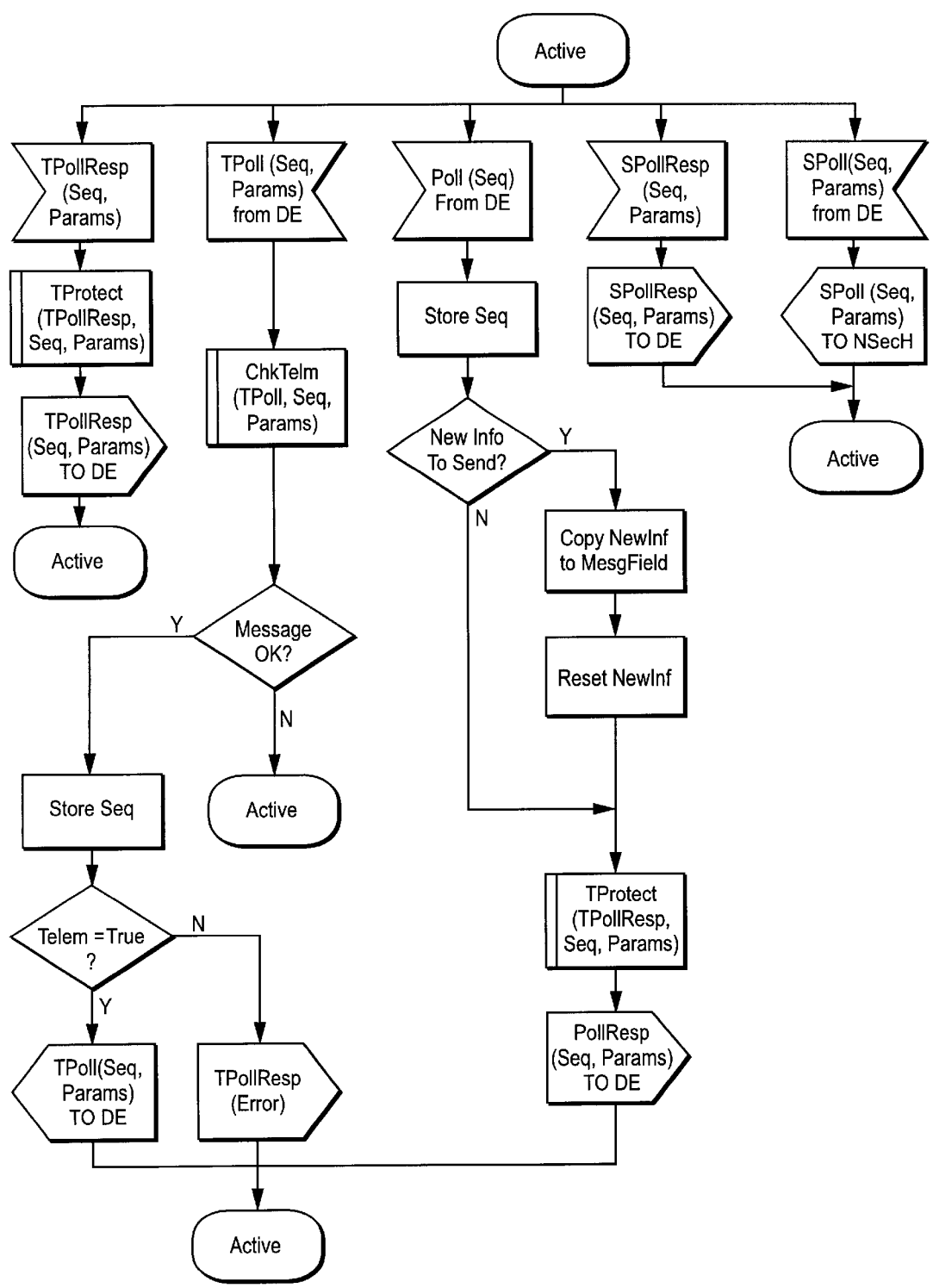
Figure 21F:
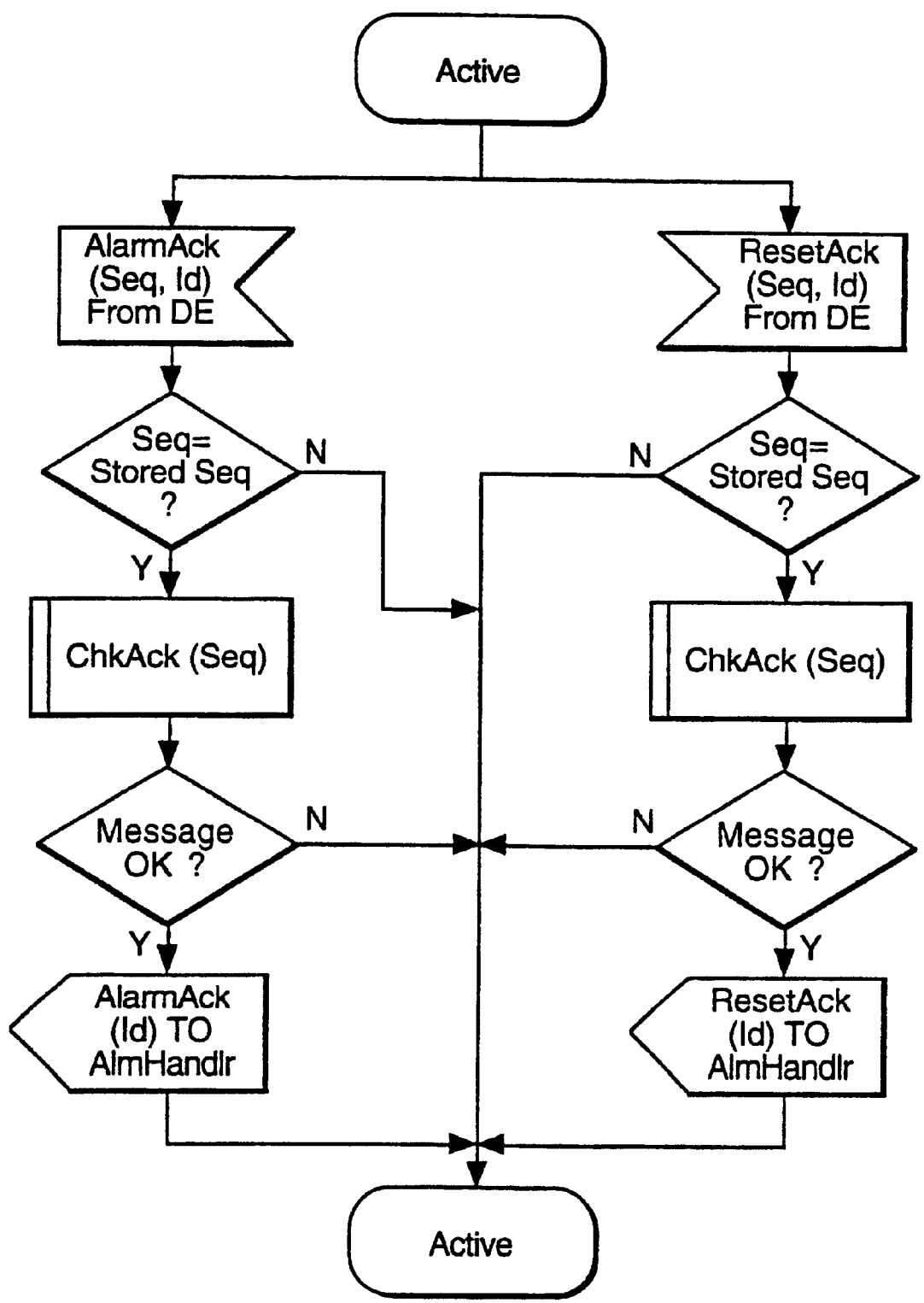
Figure 21G:
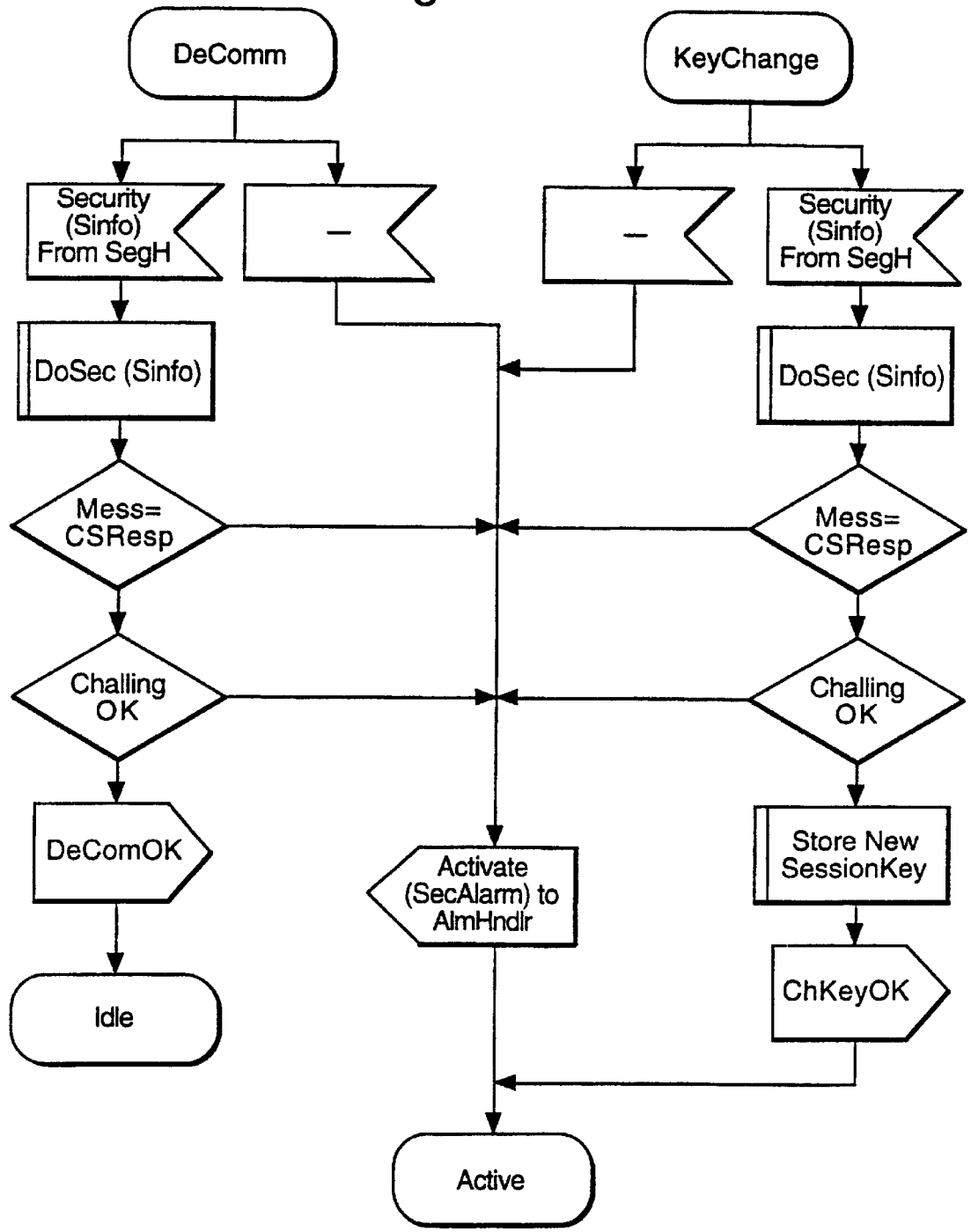

FIGS. 19 to 21 document, using the ITU SDL (Specification and Description Language) formalism, software for use in implementing the system described above. FIG. 19 shows the main process components in the CPE. These comprise the Alarm Handler Process (AlrmHndlr), the Protocol and Security Process (ProtH) and the Segmentation Handler (SegmH). The last of these is a transport protocol which is generally conventional in nature, and which may be substituted by other transport protocols. In the Figure, interface R9 is an output to a GSM backup link, which may be used to communicate with the central station in the event that the telephone line is cut. Interfaces R3, R4 are connected to the alarm hardware. R10 is the route for the security violation signal. R5,R6 are the normal interactions between the alarm handler and ProtH components, and R7,R8 are the normal interactions between SegmH and ProtH. R1,R2 are the connections to/from the ISDN D channel and R11,R12 are connections to an alternative communications channel, for example to the GSM network.

FIG. 20 shows the Alarm Handler Process, and corresponds to the state diagram of FIG. 5B. FIG. 20a shows the transitions from start-up. FIG. 20b shows the transitions from Alarm to outstanding. FIG. 20c shows transitions from outstanding to reset-raised, from reset-raised to reset, and from reset to normal. FIG. 20d shows transitions from alarm-raised to alarm.

FIG. 21 shows the Protocol and Security Process and corresponds to the state diagram of FIG. 5A. FIG. 21A shows the transitions from idle to commissioning. FIG. 21D shows commissioning to active, 21C decommissioning and security changes in the Active state, 21D normal and outstanding messages from the data engine, and acknowledgements, in the Active state. FIG. 21E shows polling in the Active state, 21F acknowledgement of Alarms and Clears in the Active state, and 21G shows additional features of the transitions of FIG. 21C.

TABLE 1

|  | T1 | T2 | T3 | T4 | T5 |
|---|---|---|---|---|---|
| C1 - Polling | ✓ | | | | |
| C2 - Integrity Check | | ✓ | | | |
| C3 - Binding to request | | | ✓ | | |
| C4 - Encryption | | | | | ✓ |
| C5 - Mutual Authentication | | | | ✓ | ✓ |

TABLE 2

```
MD5 (...)
{
    static int ip;
    ..........
    for (round=1; round<5; ++round)
    {
        ....
        if (round == 3 )
            for (x=0; x<13; ++x)
            {
                rand[ip] = MD5buffer[x];
                ip = (ip+1) & 511;
            }
        ....
    }
}
```

TABLE 3

| Timer or Counter | Value | Description |
|---|---|---|
| N701 | 1 | Number of Transfer Segment Re-transmissions |
| N721 | 154 | Maximum Message Size |
| T720 | 30 secs | Security Time Interval for Challenge Responses |
| $T_{721}$ | 6 secs | Time interval for CPE retransmissions |

What is claimed is:

1. A method of operating a communications system including a telecommunications link between a remote terminal and a control station, the method comprising:
   a) transmitting polling requests on a digital messaging channel carried on the telecommunications link, each polling request including a unique identifying code;
   b) generating at the remote terminal a poll response message and encrypting a part of said poll response message, the encrypted part of the poll response message including the unique identifying code for the polling request;
   c) returning a response signal from the remote terminal to the control station on the digital messaging channel; and
   d) decrypting the poll response message at the control station.

2. A method according to claim 1, in which the digital messaging channel is the D channel of an ISDN circuit.

3. A method according to claim 1, in which the remote terminal is a security alarm and in which the poll response includes data indicating the alarm status.

4. A method according to claim 1, in which the remote terminal transmits the poll response message in a plurality of segments and in which the control station returns to the remote terminal an acknowledgement of each message received and a further acknowledgement for a message assembled from the segments.

5. A method according to claim 1, in which the telecommunications link includes a local access network which links the remote terminal to a local exchange.

6. A method according to claim 1, in which each polling request from the control station includes a different identifying code, and the encrypted part of the poll response includes the identifying code of the respective poll request.

7. A method according to claim 1, in which some of the polling requests are transmitted over a wireless communications link.

8. A communications system, comprising:
   a) a control station including
      a polling request generator for generating a polling request including a unique identifying code; and
      a decoder for decoding poll response messages;
   b) a remote terminal including
      a polling response generator for generating a polling response message;
      an encoder arranged to encode a part of the polling response message, said encoded part including the unique identifying code specific to a polling request; and
   c) a telecommunications circuit including
      a digital messaging channel which, in use, carries polling requests from the control station to the remote terminal and carries said encoded response messages from the remote terminal to the control station.

9. A system according to claim 8, in which the telecommunications circuit is an ISDN circuit, and the messaging channel is carried in the D channel of the ISDN circuit.

10. The system as in claim 8, further comprising:
    a digital messaging channel interface arranged to transmit and receive messages to and from the remote terminal on the digital messaging channel.

11. The system as in claim 8, wherein:
    the polling request generator is arranged to generate a polling request for transmission on the digital messaging channel.

12. The system as in claim 8, wherein said control station further comprises:
    a controller for interpreting the poll response messages.

13. A method of operating a communications system including a telecommunications link between a remote terminal and a control station, the method comprising:
    a) transmitting polling requests on a digital messaging channel carried on the telecommunications link, each polling request including a unique identifying code;

b) generating at the remote terminal a poll response message and encrypting a part of said poll response message, the encrypted part of the poll response message including the unique identifying code for the polling request;

c) returning a response signal from the remote terminal to the control station on the digital messaging channel; and d) decrypting the poll response message at the control station.

14. A communications system including a telecommunications link between a remote terminal and a control station, the system comprising:

a) a control station including
   i. a polling request generator for generating and transmitting polling requests, each polling request including a unique identifying code;
   ii. a decoder for decrypting a poll response message received from a remote terminal;

b) the remote terminal including
   i. a polling response generator for generating a poll response message;
   ii. an encoder for encrypting a part of said poll response message, the encrypted part of the poll response message including the unique identifying code of the polling request; and c) a telecommunications circuit including
   a digital messaging channel for communicating polling requests from the control station to the remote terminal and poll response messages from the remote terminal to the control station.

15. A communications system including a telecommunications link between a remote terminal and a control station, the method comprising:

a) means for transmitting polling requests on a digital messaging channel carried on the telecommunications link, each polling request including a unique identifying code;

b) means for generating at the remote terminal a poll response message and encrypting a part of said poll response message, the encrypted part of the poll response message including the unique identifying code for the polling request;

c) means for returning a response signal from the remote terminal to the control station on the digital messaging channel; and d) means for decrypting the poll response message at the control station.

16. A method of operating a communications system including a telecommunications link between a remote terminal and a control station, the method comprising:

a) transmitting polling requests on a digital messaging channel carried on the telecommunications link, each polling request including a unique identifying code;

b) generating at the remote terminal a poll response message and encrypting a part of said poll response message, the encrypted part of the poll response message including the unique identifying code for the polling request;

c) appending a keyed cryptographic has of the poll response message to the poll response message, said poll response message including a hash function identifier;

d) returning a response signal from the remote terminal to the control station on the digital messaging channel; and e) decrypting the poll response message at the control station.

17. A communications system including a telecommunications link between a remote terminal and a control station, the system comprising:

a) means for transmitting polling requests on a digital messaging channel carried on the telecommunications link, each polling request including a unique identifying code;

b) means for generating at the remote terminal a poll response message and encrypting a part of said poll response message, the encrypted part of the poll response message including the unique identifying code for the polling request;

c) means for appending a keyed cryptographic has of the poll response message to the poll response message, said poll response message including a hash function identifier;

d) means for returning a response signal from the remote terminal to the control station on the digital messaging channel; and e) means for decrypting the poll response message at the control station.

* * * * *